(12) United States Patent
Offermann et al.

(10) Patent No.: US 9,694,653 B2
(45) Date of Patent: Jul. 4, 2017

(54) TRANSPARENT LAMINATED GLASS AND USE THEREOF

(71) Applicant: SAINT-GOBAIN GLASS FRANCE, Courbevoie (FR)

(72) Inventors: Volkmar Offermann, Eschweiler (DE); Benno Dunkmann, Liege (BE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 323 days.

(21) Appl. No.: 14/700,003

(22) Filed: Apr. 29, 2015

(65) Prior Publication Data

US 2015/0231949 A1    Aug. 20, 2015

Related U.S. Application Data

(63) Continuation of application No. 13/147,192, filed as application No. PCT/EP2010/055108 on Apr. 19, 2010, now Pat. No. 9,044,919.

(30) Foreign Application Priority Data

Apr. 20, 2009   (DE) ..................... 10 2009 017 805

(51) Int. Cl.
*B60J 1/02*     (2006.01)
*B32B 38/00*    (2006.01)
*B32B 37/18*    (2006.01)
*B32B 17/10*    (2006.01)

(52) U.S. Cl.
CPC ........... *B60J 1/02* (2013.01); *B32B 17/10064* (2013.01); *B32B 17/10761* (2013.01); *B32B 37/182* (2013.01); *B32B 38/0012* (2013.01); *B32B 2250/03* (2013.01); *B32B 2307/412* (2013.01); *B32B 2605/006* (2013.01)

(58) Field of Classification Search
CPC ........................... B60J 1/02; B32B 17/10761
See application file for complete search history.

(56) References Cited

U.S. PATENT DOCUMENTS

| | | | | |
|---|---|---|---|---|
| 3,658,636 A | * | 4/1972 | Beckmann | B32B 17/10036 428/437 |
| 3,799,817 A | * | 3/1974 | Van Laethem | B32B 17/10018 156/101 |
| 4,898,789 A | * | 2/1990 | Finley | B32B 17/10036 428/432 |
| 5,162,145 A | * | 11/1992 | Schaefer | B32B 17/10036 428/209 |

* cited by examiner

*Primary Examiner* — Daniel Lee
(74) *Attorney, Agent, or Firm* — Steinfl + Bruno LLP

(57) ABSTRACT

A transparent laminated glass is described. The transparent laminated glass can comprise a transparent outer pane, at least one polymer layer, and a transparent inner pane. Uses of the transparent laminated glass are also described.

6 Claims, 2 Drawing Sheets

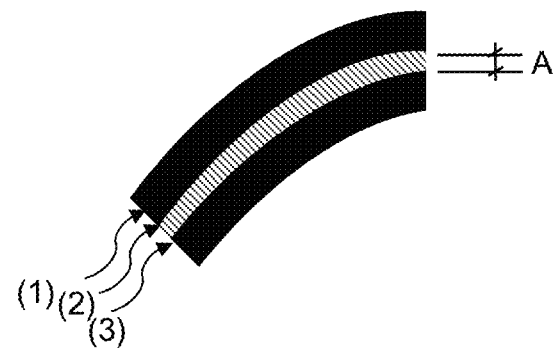
Fig. 1 – Prior Art
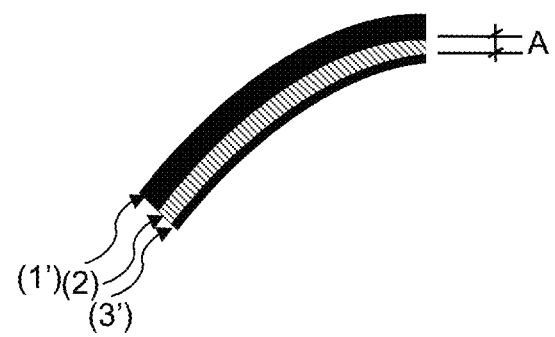
Fig. 2

TRANSPARENT LAMINATED GLASS AND USE THEREOF

CROSS REFERENCE TO RELATED APPLICATIONS

The present application is a continuation of U.S. patent application Ser. No. 13/147,192 filed on Jul. 29, 2011 which, in turn, is the US national stage entry of International Patent Application No. PCT/EP2010/055108 filed on Apr. 19, 2010 which, in turn, claims priority to German Patent Application No. 102009017805.8 filed on Apr. 20, 2009, all of which are hereby incorporated by reference in their entirety.

BACKGROUND

The present invention relates to a transparent laminated glass for motor vehicle glazings.

Additionally, the present invention relates to a new use of the new transparent laminated glass.

From the U.S. Pat. No. 7,070,863 B2, a laminated glass pane for automobile glazings is known that comprises at least one glass pane with a thickness between 0.8 mm and 1.7 mm. The edge compressive stress is 20 MPa to 80 MPa and is thus elevated compared to the compressive stress of 5 MPa to 60 MPa in the center of the glass pane surface.

From DE 44 15 878 C2, a laminated glass pane for motor vehicles is known that comprise [sic] thin glasses with a thickness between 0.2 mm and 1.5 mm and a plastic pane. To compensate for mechanical tensions between the individual materials, an adhesive layer is disclosed.

U.S. Pat. No. 6,270,605 B1 describes a method for production of a curved multilayer glass and polymer laminated pane, comprising two thin glasses with a thermoplastic layer between them with a specific weight that is less than glass. Each glass layer has a thickness that amounts to ⅓ or less of the total thickness of the laminate.

U.S. Pat. No. 5,589,272 A discloses a transparent glass and polymer laminated pane with glass thicknesses between 0.3 mm and 0.7 mm. Between the glass and polymer panes, there are polymer layers that act, for one thing, as adhesion promoters and, for another, as elastic intermediate layers to compensate for mechanical tensions within the laminate.

SUMMARY

In a symmetrical laminated glass, the inner pane and the outer pane have the same pane thickness. In an unsymmetrical structure, the laminated glass includes an inner pane and an outer pane with different thicknesses.

The laminated glass panes as described have the disadvantage that they do not meet at least one of the essential mechanical and optical requirements for automobile glazings such as rigidity and stability, stone impact resistance, optical distortion in the field of vision, abrasion and scratch resistance of the surfaces together with reduced total weight of the laminated glass.

An object of the present invention is to provide a product that meets the requirements for motor vehicle glazings regarding mechanical rigidity and stability, stone impact resistance, optical distortion in the field of vision, abrasion and scratch resistance of the surfaces together with reduced total weight of the laminated glass.

An additional object of the present invention is to provide a new use of the transparent laminated glass.

DETAILED DESCRIPTION

The object of the invention is accomplished through the characteristics mentioned in claim 1. The transparent laminated glass comprises a transparent outer pane with a thickness of 1.45 mm to 1.8 mm, preferably 1.75 mm to 1.8 mm, at least one polymer layer with a thickness of 0.5 mm to 4.0 mm and a transparent inner pane with a thickness of 1.0 mm to 1.4 mm, wherein the at least one polymer layer contains ethylene vinyl acetates, plasticized polyvinyl butyrals, polyurethanes, polycarbonates, polyethylene terephthalates, and/or ionomers as well as copolymers and/or combinations thereof, and the ratio of the thickness of the transparent outer pane to the sum of the thicknesses of the transparent outer pane and of the transparent inner pane is 0.509 to 0.643, preferably 0.563 to 0.592.

And last but not least, the new use of the laminated glass according to the invention in motor vehicle glazing has been found, preferably as windshields and particularly preferably as windshields with high stone impact resistance.

The new invention achieves, through a new unsymmetrical laminate structure of thin panes and at least one polymer layer, a weight reduction. The requirements for safety glazings in motor vehicles (ECE-R 43:2004) and, in particular, the requirements for mechanical rigidity and stability, stone impact resistance, optical distortion, abrasion and scratch resistance of the surfaces are met.

In a preferred embodiment, a relatively thick, at least single-ply, polymer layer is used. This increases the mechanical rigidity of the laminate. Preferably, the thickness of the at least single-ply polymer layer is 0.8 mm to 3.8 mm. The weight increase of the laminated glass with increased polymer layer thickness is small due to the smaller specific gravity of the polymers compared to the specific gravity of inorganic glasses.

For the transparent outer pane and transparent inner pane, glass is preferably used. Basically, all glasses as customarily used for the production of laminated glasses, in particular, of laminated safety glasses, come into consideration. Silicate glasses in accordance with DIN-EN 572 1 are particularly preferred.

In an advantageous embodiment of the unsymmetrical structure, the thickness of the transparent inner pane is smaller than the thickness of the transparent outer pane to obtain an unsymmetrical structure. Surprisingly, this improved the mechanical properties, in particular, stone impact resistance. Preferably, the thickness ratio of the thickness $d\_a$ of the transparent outer pane to the sum of the thickness $d\_a$ of the transparent outer pane and the thickness $d\_i$ of the transparent inner pane 0.552 to 0.571. The thickness ratio is calculated using the formula $d\_a/(d\_a+d\_i)$.

In a preferred embodiment, the thickness of the transparent outer pane is roughly 1.6 to 1.8 mm and the thickness of the transparent inner pane is preferably 1.2 to 1.4 mm.

At least one polymer layer is in contact with the glass surface. This contains ethylene vinyl acetates (EVA), plasticized polyvinyl butyrals (PVB), polyurethanes, and/or ionomers as well as copolymers and/or mixtures thereof. Materials such as EVA have good adhesion on silicate glasses. An adhesion promoter is unnecessary between the glass and polymer. The lamination process is thus less complex and costly.

A multilayer system of polymer layers between the outer pane and the inner pane is particularly preferable, to increase the distance between the outer glass and the inner glass. The mechanical rigidity of the laminated glass according to the invention is thus increased.

To further increase its stability and mechanical rigidity, the laminated glass according to the invention can be bent two- or three-dimensionally in both the longitudinal direction and/or the transverse direction.

The flat or curved inner panes and outer panes and the at least one polymer layer are preferably bonded in an autoclave process. A permanent bond is achieved through pressure and heat.

The area of the laminated glass according to the invention can vary broadly and is determined by the use according to the invention. The area can be a few 10 square centimeters for side window panes up to several square meters for windshields, rear windows, or glass roofs for motor vehicles.

The glass pane is preferably designed as a heat-screening pane with either one or both individual panes of the laminated glass pane being made of a tinted heat-screening glass and/or provided with a heat-ray reflecting coating.

In a further embodiment, at least one of the polymer layers has a coating that absorbs or reflects infrared radiation. Preferably, the polymer layer that absorbs or reflects infrared radiation includes polyethylene terephthalates as well as copolymers thereof.

In an advantageous embodiment of the invention, the transparent inner pane or transparent outer pane is completely or partially coated on the side itself facing the polymer with an infrared radiation absorbing or reflecting layer. Thus, the motor vehicle glazing can be adapted in its transmission properties to the temperature requirements in the interior of motor vehicles. Basically, all customary and known infrared radiation shielding materials that are stable under the conditions of production and use of the laminated glass according to the invention come into consideration. Thin layers in the range from 1 nm to 1000 nm deposited on the glass are preferred. These layers can be applied by sputtering or chemical deposition from the gas phase. The at least one layer can contain silver or conductive transparent oxides such as doped tin oxide, zinc oxide, or mixtures thereof.

Partial areas of the transparent laminated glass can be covered by an opaque coating. Preferably, the transparent outer pane or inner pane is partially coated by silkscreening on the side facing the polymer. By means of silkscreening, the outer pane can be completely or partially coated; preferably, the edge region of the laminated glass according to the invention is coated peripherally. In particular, the opaque coating is carried out in the form of a frame along the edge with a width of preferably 10 mm to 300 mm. By means of the covering, possible inhomogeneities of the transmission properties or bonding adhesive arrangements are, for example, concealed. The solvent-containing or chemically reactive tint layers, preferably black tint, with thicknesses from 1 μm to 500 μm are permanently stabilized using known temperature processes.

The laminated glass according to the invention also meets the requirements for laminated glazings in motor vehicle construction according to ECE-R 43:2004 with regard to fracture pattern, mechanical stability, optical properties, and resistance to external effects such as irradiation, moisture, and abrasion. The laminated glass meets, in particular, the requirements for mechanical rigidity and stone impact resistance. The laminated glass according to the invention can, accordingly, be used preferably as glazing of motor vehicles.

Because of the forces acting on the shell, e.g., due to wind forces at relatively high driving speeds and because of the torsional loads that can act on the car body, a glazing for motor vehicles must have high shape stability and torsional rigidity. The laminated glass according to the invention enables edge compressive stresses on the transition from the glass surface to the ground edge greater than/equal to 8 MPa, which corresponds to the typical requirements in motor vehicle construction.

To increase the stone impact resistance, the compressive stresses in the outer pane are minimized. On the transition from the glass surface to the ground edge, the value is less than 7 MPa, which corresponds to the typical requirements in motor vehicle construction. Low mechanical compressive stresses in the outer pane favor a high stone impact resistance. Mechanical tensions can be measured with the Sénarmont or Friedel method. A suitable measurement device is, for example, the "Edge Stress Master" of the company SHARPLESS STRESS ENGINEERS LTD.

The stone impact resistance of a laminated glass can be determined through the probability of fracture of the laminated glass upon impact of a projectile with a defined shape and defined kinetic energy E. It is possible to define the threshold energy $E\_t$ of the projectile, at which the probability of fracture is 50%. The threshold energy $E\_t$ is proportional to the square of the thickness $d\_a$ of the outer pane, divided by the sum of the thickness $d\_a$ of the outer pane and the thickness $d\_i$ of the inner pane.

The optical distortion in the field of vision in motor vehicle glazings is a critical factor, in particular with thin outer panes and inner panes. The optical distortion of laminated glazings within the vision zone A is less than/equal to 2 arc minutes and, in particular, less than 1 arc minute (described in ECE-R 43:2004 A3/9.2).

If the inner pane and the outer pane are made of silicate glass, there is adequate abrasion and scratch stability corresponding to a laminated glass of the prior art. An abrasion test is described in ECE-R 43:2004, Test A14/6.1.

The ratio of the thickness of the inner pane to the thickness of the outer pane substantially affects mechanical stability and rigidity, stone impact resistance, and optical properties. Preferred combinations are listed in Table 1.

TABLE 1

| Inner Pane Thickness ($d\_i$) in [mm] | Outer Pane Thickness ($d\_a$) in [mm] | $d\_a/(d\_i + d\_a)$ [.] |
|---|---|---|
| 1.4 | 1.8 | 0.563 |
| 1.3 | 1.7 | 0.567 |
| 1.3 | 1.6 | 0.552 |
| 1.2 | 1.6 | 0.571 |
| 1.1 | 1.4 | 0.560 |

BRIEF DESCRIPTION OF THE DRAWINGS

One embodiment of the invention is depicted in the drawings and is described in greater detail in the following. FIG. 1 through 3 are schematic depictions that illustrate the principle of the invention. The schematic depictions do not have to be to scale.

They depict

Figure 3:
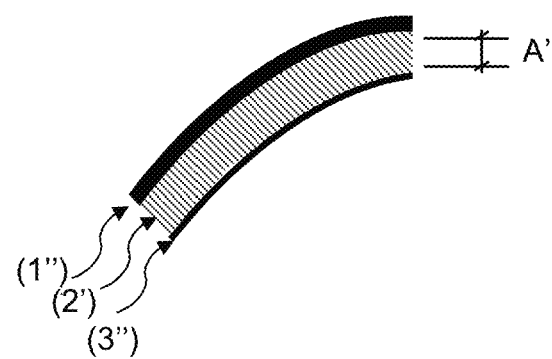

FIG. 1 a cross-section through a symmetrical transparent laminated glass according to the prior art, FIG. 2 a cross-section through an unsymmetrical transparent laminated glass according to the invention with reduced glass thicknesses, and FIG. 3 a cross-section through the unsymmetrical transparent laminated glass according to the invention with further reduced glass thicknesses and an increased distance between the inner pane and the outer pane.

In FIG. 1 through 3, the reference characters have the following meaning:
(1) Transparent outer pane
(2) PVB bonding film
(3) Transparent inner pane
(1') Transparent outer pane with reduced thickness
(2') PVB bonding film with increased layer thickness
(3') Transparent inner pane with reduced thickness
(A) Distance between outer pane and inner pane
(A') Increased distance between outer pane and inner pane (1") Transparent outer pane with further reduced thickness
(3") Transparent inner pane with further reduced thickness

EXAMPLES

A comparative example according to the prior art is depicted in FIG. 1. The laminated glass was produced symmetrically with an outer pane (1) of the thickness 2.1 mm and an inner pane (3) with a thickness of 2.1 mm in an autoclave process. A conventional bonding film (2) with a thickness of 0.76 mm was used. The distance (A) between the inner pane (3) and the outer pane (1) was accordingly roughly 0.76 mm.

An exemplary embodiment according to the invention is depicted in FIG. 2. The laminated glass was produced unsymmetrically with a bent outer pane (1') of a thickness of 1.8 mm and a bent inner pane (3') with a thickness of 1.4 mm in an autoclave process. A conventional PVB bonding film (2) with a thickness of 0.76 mm was used. The distance (A) between the inner pane (3') and the outer pane (1') was accordingly roughly 0.76 mm. The value of the mechanical tensile stresses of the transparent outer pane (1') was measured as less than 7 MPa and was reduced compared to the comparative example. The stone impact resistance of the substrate according to the invention increased compared to the comparative example. The kinetic threshold energy $E\_t$ of a projectile at which a 50% fracture probability of the laminated glass was measured increased by 25% compared to the comparative example. The value of the mechanical compressive stresses of the laminated glass was measured as greater than 10 MPa. The optical distortion in zone A was in the range of less than 1 arc minute. The weight of the pane was reduced.

FIG. 3 depicts a variation of the transparent laminated glass according to the invention. The laminated glass was produced unsymmetrically with an outer pane of a thickness of 1.7 mm (1") and an inner pane (3") with a thickness of 1.3 mm in an autoclave process. A multilayer polymer layer containing PVB bonding film (2') with a thickness of 0.86 mm was used. The distance (A') between the inner pane (3") and the outer pane (1") was accordingly roughly 0.86 mm.

The kinetic threshold energy $E\_t$ of a projectile at which a 50% fracture probability of the laminated glass was measured increased by 25% compared to the comparative example. The value of the mechanical compressive stresses of the laminated glass was measured as greater than 10 MPa. The optical distortion in zone A was in the range of less than 1 arc minute. The weight of the pane was further reduced compared to the previous exemplary embodiment.

The results from the comparative example (FIG. 1) and the exemplary embodiments (FIG. 2 and FIG. 3) are depicted in Table 2.

TABLE 2

| Example | Outer pane Reference | Thickness [mm] | PVB bonding film Reference | Thickness [mm] | Inner pane Reference | Thickness [mm] | Stone impact resistance | Weight |
|---|---|---|---|---|---|---|---|---|
| FIG. 1 | (1) | 2.1 | (2) | 0.76 | (3) | 2.1 | — | — |
| FIG. 2 | (1') | 1.8 | (2) | 0.76 | (3') | 1.4 | Improved | Reduction |
| FIG. 3 | (1") | 1.7 | (2') | 0.86 | (3") | 1.3 | Improved | Greater reduction |

Surprisingly and unexpectedly, the laminated glass according to the invention has improved stone impact resistance.

The invention claimed is:

1. A method to fabricate a transparent laminated glass for motor vehicle glazings as a windshield with high stone impact resistance, the method comprising bonding a transparent outer pane, made of silicate glass with a thickness of 1.6 mm to 1.8 mm, to at least one polymer layer with a thickness of 0.76 mm or 0.86 mm, and bonding a transparent inner pane, made of silicate glass with a thickness of 1.2 mm to 1.4 mm, to the at least one polymer layer, wherein the at least one polymer layer contains plasticized polyvinyl butyrals and the ratio of the thickness of the transparent outer pane to the sum of the thickness of the transparent outer pane and the transparent inner pane is from 0.552 to 0.571.

2. The method to fabricate a transparent laminated glass of claim 1, wherein the thickness of the transparent outer pane is 1.70 mm to 1.80 mm.

3. The method to fabricate a transparent laminated glass of claim 1, further comprising bending the transparent laminated glass two-dimensionally and/or three-dimensionally in a longitudinal direction and/or a transverse direction of the transparent laminated glass.

4. The method to fabricate a transparent laminated glass of claim 1, further comprising completely or partially coating the transparent inner pane or the transparent outer pane on a side facing the at least one polymer layer with at least one infrared radiation shielding layer with a thickness of 1 nm to 1000 nm.

5. The method to fabricate a transparent laminated glass of claim 1, further comprising coating the at least one polymer layer with a layer that absorbs or reflects infrared radiation.

6. The method to fabricate a transparent laminated glass of claim 1, further comprising partially coating with an opaque layer the transparent outer pane on the side facing the at least one polymer layer, and wherein the transparent outer pane is in the shape of a frame with a width of 10 mm to 300 mm and the opaque layer has a thickness of 1 μm to 500 μm.

* * * * *